United States Patent
Gupta (10) Patent No.: US 11,922,226 B2
(45) Date of Patent: Mar. 5, 2024

(54) ADAPTIVE CONTROL OF DEADLINE-CONSTRAINED WORKLOAD MIGRATIONS

(71) Applicant: KYNDRYL, INC., Armonk, NY (US)

(72) Inventor: Manish Gupta, New Delhi (IN)

(73) Assignee: Kyndryl, Inc., New York, NY (US)

( * ) Notice: Subject to any disclaimer, the term of this patent is extended or adjusted under 35 U.S.C. 154(b) by 450 days.

(21) Appl. No.: 17/362,774

(22) Filed: Jun. 29, 2021

(65) Prior Publication Data
US 2022/0413942 A1    Dec. 29, 2022

(51) Int. Cl.
G06F 9/50    (2006.01)
G06F 11/07   (2006.01)

(52) U.S. Cl.
CPC .......... G06F 9/5088 (2013.01); G06F 9/5038 (2013.01); G06F 9/505 (2013.01); G06F 11/0757 (2013.01)

(58) Field of Classification Search
CPC ...... G06F 9/5088; G06F 9/5038; G06F 9/505; G06F 11/0757; G06F 2209/5019; G06F 9/4856; G06F 9/4887; G06F 11/3433; G06F 11/3006
See application file for complete search history.

(56) References Cited

U.S. PATENT DOCUMENTS

| | | | |
|---|---|---|---|
| 9,430,506 B2 | 8/2016 | Schuenzel et al. | |
| 9,792,339 B2 | 10/2017 | Jayapal et al. | |
| 9,804,879 B2 | 10/2017 | Anerousis et al. | |
| 10,599,367 B2 | 3/2020 | Delaney et al. | |
| 2012/0109844 A1 | 5/2012 | Devarakonda et al. | |
| 2015/0172205 A1 | 6/2015 | Anderson et al. | |
| 2019/0158417 A1 | 5/2019 | Aronovich et al. | |
| 2019/0370134 A1 | 12/2019 | Salapura et al. | |
| 2019/0384634 A1 | 12/2019 | Nanduru et al. | |
| 2020/0026562 A1 | 1/2020 | Bahramshahry et al. | |
| 2022/0027182 A1* | 1/2022 | Igelka | G06F 3/067 |

OTHER PUBLICATIONS

Huber, R., et al., "Cloud Migration and Transformation: Wave Planning," [online] Medium.com, Aug. 13, 2020, retrieved from the Internet: <https://medium.com/@rebecca_huber/cloud-migration-and-transformation-wave-planning-a1f0e6ff3b3f>, 8 pg.

(Continued)

Primary Examiner — Sisley N Kim
(74) Attorney, Agent, or Firm — Van Leeuwen & Van Leeuwen; Daniel C. Housley (57) ABSTRACT

Adaptive control of deadline-constrained workload migrations can include monitoring migrations of workloads forming a wave migrating from a source computing node to a target computing node. The monitoring can be performed in real time. The migrations can be performed by transferring image replications of each workload over a data communication network. Based on an expected bandwidth availability, a likelihood that a cutover deadline associated with the wave is exceeded prior to completing a migration of each of the wave's workloads can be predicted. Migration of one or more selected workloads can be suspended in response to determining that exceeding the cutover deadline prior to completing migration of each of the wave's workloads is likely.

20 Claims, 7 Drawing Sheets (56) References Cited

OTHER PUBLICATIONS

"Comparison: Zerto vs. Site Recovery Manager (SRM) & vSphere Replication," [online] ActualTech Media © 2021, Mar. 10, 2014, retrieved from the Internet: < http://www.virtualizationsoftware.com/zerto-vs-vmware-site-recovery- manager-srm-vsphere-replication/>, 7 pg.

Mosley, M., "Understanding Virtual Protection Groups in Zerto for Disaster Recoverym" [online] © 2018 iland, a cloud aabove—the iland blog, Nov. 16, 2015, retrieved from the Internet: <https://blog.iland.com/cloud/understanding-virtual-protection-groups-in-zerto-for-disaster-recovery/>, 11 pg.

"Zerto Analytics APIs," [online] Zerto Ltd. © 2010-2021 [retrieved Jun. 28, 2021], retreived from the Internet: <https://docs.api.zerto.com/#>, 54 pg.

"Zerto Scale and Benchmarking Guidelines," [online] Zerto Ltd. © 2021, Rev01, Feb. 2021, ZVR-ZSB-8.5 U2, retrieved from the Internet: <http://s3.amazonaws.com/zertodownload_docs/Latest/Zerto%20Scale%20and%20Benchmarking%20Guidelines.pdf>, 35 pg.

Mell, P et al., The NIST Definition of Cloud Computing, National Institute of Standards and Technology, U.S. Dept. of Commerce, Special Publication 800-145, Sep. 2011, 7 pg.

\* cited by examiner

ADAPTIVE CONTROL OF DEADLINE-CONSTRAINED WORKLOAD MIGRATIONS

BACKGROUND

This disclosure relates to electronic data processing and storage, and more particularly, to workload migrations from one source to a remotely located target.

Workload migration, broadly defined, is the movement of system and application programs, files, data, and other computing assets from one computing infrastructure to another computing infrastructure remotely located from the other one. Virtually every type of entity (e.g., business, government organization) that operates multiple computing nodes and routinely processes and stores large volumes of data will likely have reason at some time to perform at least one workload migration. Reasons for workload migration include, for example, data center consolidation, modernization, maintenance, and a host of other reasons to enhance operative efficiency of servers, virtual machines (VMs), containers, or other computing resources.

SUMMARY

In one or more embodiments, a method includes monitoring migrations of workloads forming a wave migrating from a source computing node to a target computing node, wherein the monitoring is performed in real time, and the migrations are performed by transferring image replications of each workload over a data communication network. The method includes predicting, based on an expected bandwidth availability, a likelihood that a cutover deadline associated with the wave is exceeded prior to completing a migration of each of the wave's workloads. The method includes suspending migration of one or more selected workloads in response to determining that exceeding the cutover deadline prior to completing migration of each of the wave's workloads is likely.

In one or more embodiments, a system includes a processor configured to initiate operations. The operations include monitoring migrations of workloads forming a wave migrating from a source computing node to a target computing node, wherein the monitoring is performed in real time, and the migrations are performed by transferring image replications of each workload over a data communication network. The operations include predicting, based on an expected bandwidth availability, a likelihood that a cutover deadline associated with the wave is exceeded prior to completing a migration of each of the wave's workloads. The operations include suspending migration of one or more selected workloads in response to determining that exceeding the cutover deadline prior to completing migration of each of the wave's workloads is likely.

In one or more embodiments, a computer program product includes one or more computer readable storage media having instructions stored thereon. The instructions are executable by a processor to initiate operations. The operations include monitoring migrations of workloads forming a wave migrating from a source computing node to a target computing node, wherein the monitoring is performed in real time, and the migrations are performed by transferring image replications of each workload over a data communication network. The operations include predicting, based on an expected bandwidth availability, a likelihood that a cutover deadline associated with the wave is exceeded prior to completing a migration of each of the wave's workloads. The operations include suspending migration of one or more selected workloads in response to determining that exceeding the cutover deadline prior to completing migration of each of the wave's workloads is likely.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic data processing and storage, and more particularly, to workload migrations from one source to a remotely located target. As defined herein, "workload" is the data content electronically stored on a computing node. The data includes systems programs, applications programs, and other data structures, for example. Examples of a computing node include servers, virtual machines (VMs), containers, and the like. "Workload migration," as defined herein, is the transfer of content stored on one computing node to a different computing node. The migration can be performed by replicating images of the stored content and transmitting the image replications over a data communication network, such as a wide area network (WAN). Accordingly, a workload migration is the transfer of a quantity of data, in the form of image replications of the content of a server, VM, container, or the like, from one computing node to another via a data communication network, such as a WAN. Workload migrations serve many useful functions, but typically require intricate planning and execution. A group of related workloads, defining a "wave," which have a predetermined affinity for one another, are data structures or content electronically stored on separate computing nodes (e.g., servers) or in different VMs or containers. An affinity between workloads can arise from interdependencies between workloads, such as the dependency of a web server workload on an application server workload, which in turn depends on a database workload.

Associated with each wave is a "cutover" date, which is defined herein as a specified point in time at which all workloads of a wave must complete an initial sync. As defined herein, "initial sync" is the complete transfer, or migration, of every workload of the wave by a specific date, referred to as the cutover deadline. An initial sync, for example, is performed by fully replicating the data content stored on disks of a source server on the disks of a target server. Cutover occurs only if the replication of the disks of all servers storing workloads of the wave have completed their initial sync by the cutover deadline.

Meeting the cutover data depends greatly on the bandwidth of the data communication network over which workloads of a wave migrate from a source computing node to a target computing node. It is often the case that migration involves multiple waves, and bandwidth availability is constrained by the need to accommodate multiple waves as well as other data transfers unrelated to migration. The amount of bandwidth available for facilitating the migration is unknown in advance and typically is highly variable throughout the migration process.

The systems, methods, and computer program products disclosed herein predict the likelihood, based on expected bandwidth availability, that a cutover deadline will be exceeded before migration of each workload of a wave has completed. The prediction is based on monitoring data acquired by a migration tool, in real time, governing ongoing and pending workload migrations and by determining the expected bandwidth availability for the migrations based on samples of transmission metrics. Using the predictions, the systems, methods, and computer program products disclosed herein adaptively control the migrations of workloads in multiple waves. Pending migrations can be initiated if the determination is made that there is a likelihood that each workload of a wave will complete migration prior to the wave's cutover deadline. This is a response to unused bandwidth capacity. Conversely, if the determination is made that there is a likelihood that one or more on-going migrations will not meet their corresponding cutover deadline, certain on-going migrations are suspended to increase bandwidth availability.

An aspect of the systems, methods, and computer program products disclosed herein is the selecting of the one or more migrations that are suspended based upon determined priorities of the on-going and pending migrations. For example, selecting one or more on-going migrations can be based on ascertaining which, if any, migrating workloads belong to a wave associated with a cutover deadline later than the earliest of two or more impending cutover deadlines. If no on-going migrations are of workloads of a wave having a latter cutover deadline, then one or more workloads of the wave whose cutover deadline is nearest can be selected.

Another aspect of the systems, methods, and computer program products disclosed herein is that after each suspension, bandwidth availability can be redetermined. If suspension has not improved bandwidth availability, a search for alternative workloads to suspend ensues. If a suspension increases bandwidth availability but not enough to make completion of the migration of every workload of a wave likely, then a search for additional workloads to suspend is initiated. An alarm can be issued if it appears no corrective action will make completion of the migration of every workload of a wave likely.

By adaptively controlling the selective initiating and suspending of workload migrations, the systems, methods, and computer program products disclosed lessen the likelihood that cutover deadlines are missed while simultaneously increasing the likelihood that available bandwidth is utilized efficiently.

Another aspect of the systems, methods, and computer program products disclosed herein is reliance only on information available from existing replication tools for making predictions and adaptively controlling workload migrations. This aspect of the systems, methods, and computer program products disclosed obviates the need for a special monitoring and control network.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
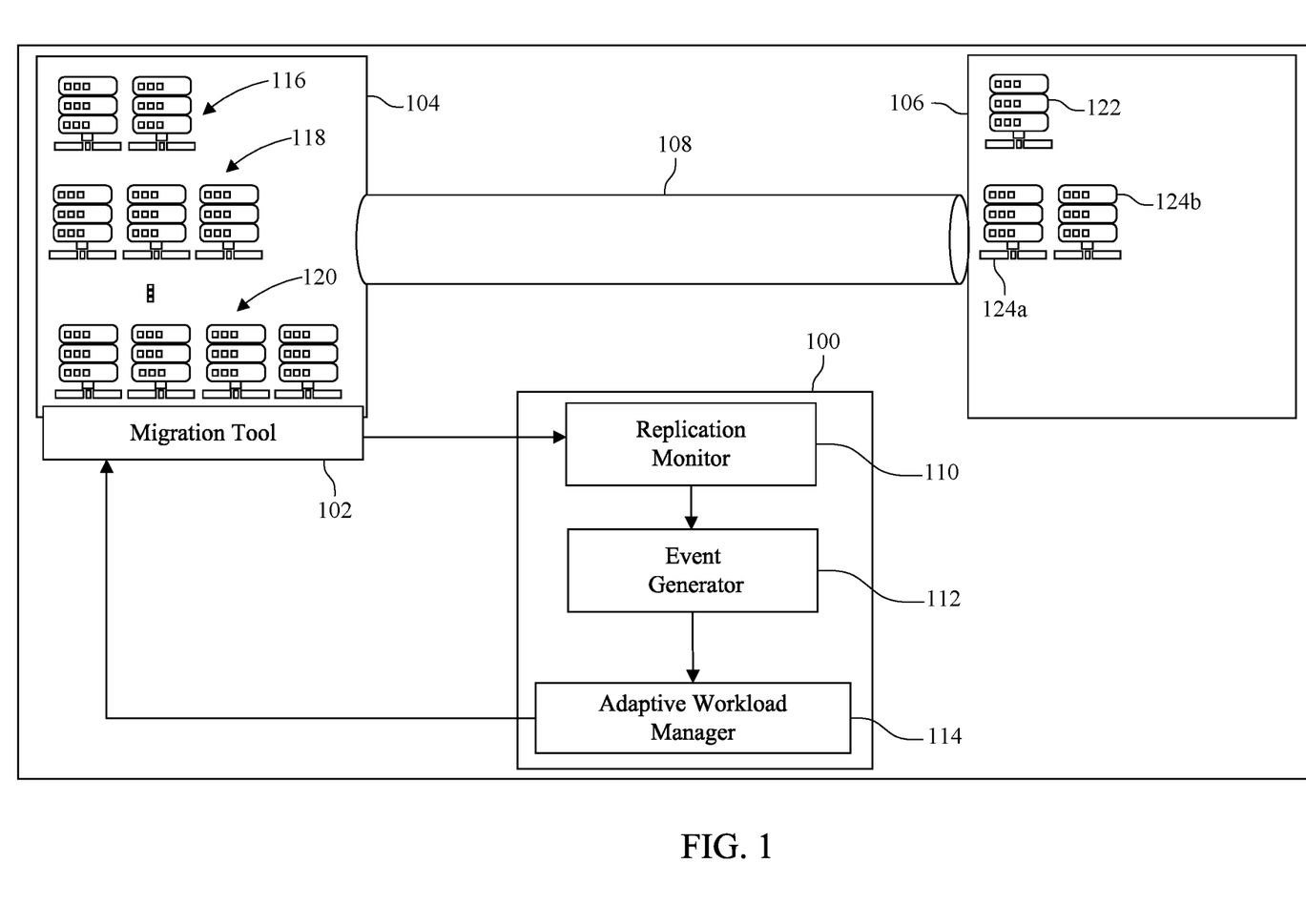
FIG. 1 depicts an example system for adaptively controlling deadline-constrained workload migrations.
Figure 2:
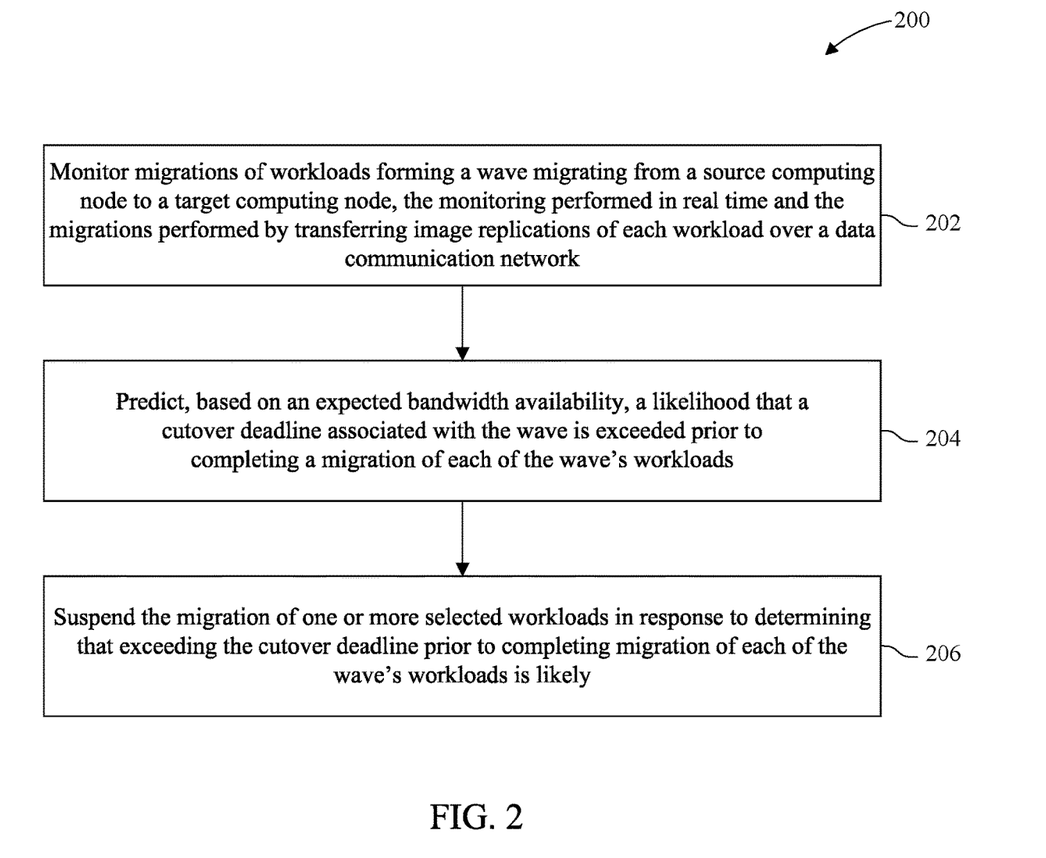
FIG. 2 depicts certain computer-implemented processes performed by the example system of FIG. 1.

FIGS. 1 and 2, respectively, illustrate an example system for adaptive control of deadline-constrained workload migrations (system) 100 and methodology 200, implemented with system 100. System 100 can be implemented in program code and/or in dedicated hardwired circuitry of a computing node (e.g., cloud-based server), such as computing node 500 described in detail with reference to FIG. 5. Illustratively, system 100 communicatively couples with migration tool 102 through a wired or wireless connection. Migration tool 102 performs workload migration operations with respect to waves stored at data center 104. Workload migration from data center 104 to data center 106 is accomplished by transmitting image replications of the workloads over data communication network 108. Illustratively, data communication network 108 is a WAN, but in other arrangements can be a local area network (LAN), the Internet, or other data communication network.

At block 202, replication monitor 110 performs the real-time monitoring of migrations of workloads forming a wave migrating from a source computing node, data center 104, to a target computing node, data center 106, via data communication network 108. Replication monitor 110 monitors the workload migrations using data electronically retrieved from migration tool 102, which communicatively couples with system 100. Replication metrics generated by migration tool 102 and acquired by replication monitor 110 can include, for example, the quantity of data (in the form of image replications) transferred (e.g., 20 gigabytes (GB) out of 100 GB transferred) as of specific time t.

At block 204, event generator 112 predicts the likelihood that a cutover deadline associated with the wave is exceeded prior to completing a migration of each workload of the wave. System 100 can adaptively control migrations of multiple waves. Illustratively, system 100 controls workload migrations from data center 104 of workloads from w (an integer value) distinct waves. Only three of the multiple waves—wave 116, wave 118, and wave 120 (corresponding to the w-th wave) are explicitly shown, it being understood that w can take on various integer values. Each of waves 116-120 is associated with a different cutover deadline. Wave 116 comprises two workloads, wave 118 comprises three, and wave 120 comprises four. Illustratively, workload 122 of wave 116 has completed migration and is stored at data center 106. Likewise, workloads 124a and 124b of wave 118 have completed migration and are also stored at data center 106. For the workloads of waves 116-120 yet to have migrated, cutover requires that each workload complete their initial sync (complete migration) by the corresponding cutover deadline.

Event generator 112, at block 204, predicts the likelihood based on expected bandwidth availability, that is, the bandwidth of data communication network 108 that is expected to be available for data migrations. Event generator 112 predicts likelihoods continuously or intermittently over a predetermined span of time. For each prediction that migration of a workload will not complete prior to the cutover deadline, event generator 112 generates a MISS. Conversely, event generator 112 generates a HIT for each prediction that migration of the workload will complete prior to the cutover deadline.

In certain arrangements, event generator 112 determines an expected bandwidth availability based on a comparison of a mean transfer rate with a required transfer rate, required in the sense that the transfer rate must be at least equal to the required rate to ensure every workload of the wave completes by or prior to the cutover deadline.

In general, with respect to an individual wave comprising N workloads whose image replications and migrations are ongoing, the total quantity of data remaining to be transferred at time t is $S(t)=\Sigma_{i=1}^{N} S_i(t)$, where $S_i(t)$ is the quantity of data of the i-th workload remaining to be transferred as of time t. $S(0)$, by definition, is the total quantity of data to be transferred when the initial sync is initiated. It is the total quantity that must be transferred for the group of N workloads in order to complete the initial sync of the wave.

Event generator 112, at time t, predicts the likelihood that a cutover deadline, C, is exceeded based on a comparison of mean transfer rate $T^*(t)$ and a transfer rate (defined below) necessary for completing migrations of the workloads of a specific wave. The mean transfer rate, $T^*(t)$, at time t, measured for example as GBs/second, is determined by event generator 112 through an averaging of m (an integer value) samples taken between an initial time and time t. A sample transfer rate, $T_r$, is determined by taking the ratio of the difference between the quantity migrated over a time interval:

$$T_r = \frac{B_r - B_q}{r - q},$$

where $B_r$ is the quantity of $S(0)$ transferred by time r, and $B_q$ is the quantity of $S(0)$ that was transferred by time q. For example, if $B_r$ is 50 GBs and $B_q$ is 20 GBs, then between time q and r, r>q, 30 GBs of data were transferred, or migrated, from source to target. Dividing the difference between $B_r$ and $B_q$ by the time interval between initial time q and latter time r yields sample transfer rate $T_r$.

Based on data generated from the real-time monitoring performed by replication monitor 110, event generator 112 can determine additional sample transfer rates by repeatedly sampling the workload migrations and averaging the samples in order to update the mean transfer rate, $T^*(t)$. In certain arrangements, thirty or more such samples are averaged to determine the overall mean transfer rate, $T^*(t)$.

Moreover, in some arrangements, the samples are weighted. Samples taken later in time can be weighted more heavily than samples taken earlier in time to give greater effect to more recent transfer rates.

A required transfer rate at time t is the ratio $S(t)/(C-t)$, where $S(t)$ is the quantity of data still to be transferred to complete the initial sync of a wave, and $C-t$ is the time remaining before cutover deadline C. At time t, if the transfer of the remaining data of a wave is to be completed by cutover deadline C, then the required transfer rate at time t, $S(t)/(C-t)$, must be equal or greater than the estimated mean transfer rate, $T^*(t)$:

$$T^*(t) \geq S(t)/(C-t).$$

Figure 3:
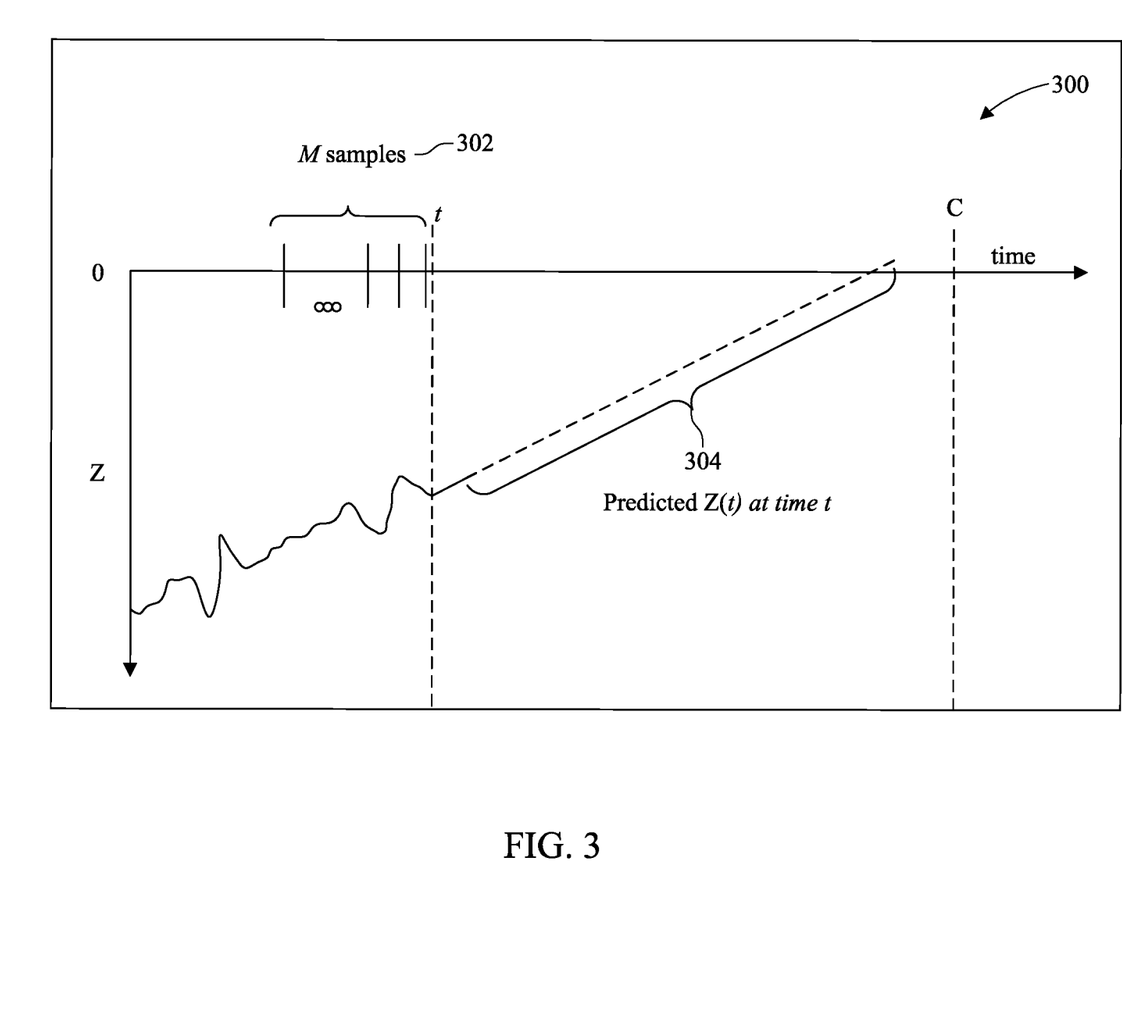
FIG. 3 is a graph representing certain operative procedures performed by the example system of FIG. 1.

Referring additionally to FIG. 3, graph 300 illustrates certain procedures performed by event generator 112 in predicting, at time t, the likelihood that a cutover deadline, C, is exceeded before the initial sync of a wave is completed. The horizontal axis of graph 300 represents time. The vertical axis represents the difference, $Z(t)$, between the required transfer rate, $S(t)/(C-t)$, and the estimated mean transfer rate, $T^*(t)$, at time t:

$$Z(t)=S(t)/(C-t)-T^*(t).$$

$Z(t)$ can be considered the equation of an affine function or straight line. The point of interest is at time t such that $T^*(t)$ (based on m samples 302) is the negative intercept of a vertical line extending through t on the horizontal axis. $S(t)/(C-t)$ is the slope of the upward extending projection 304 of $Z(t)$. Note that the greater is $S(t)$ (quantity of data remaining to be transferred) and/or the smaller $(C-t)$, the steeper the slope of projection 304 of $Z(t)$. The steepness of the slope of projection 304 determines whether projection 304 intercepts the horizontal time axis before or after the cutover cutover deadline C. If the projection 304 intercepts the horizontal time axis earlier than the cutover deadline C, then the required transfer rate is not sufficient to complete the workload migration before the deadline. Thus, the likelihood is that the cutover deadline is exceeded prior to completing the migration of the workload. Note also that the likelihood also reflects the bandwidth estimated to be available. Bandwidth availability is reflected in the the estimated mean transfer rate, $T^*(t)$, based on m samples 302. Increasing $T^*(t)$ causes a parallel shift of straight-line projection 304 of $Z(t)$ downward, which moves projection 304's intercept with the horizontal time axis farther out in the positive direction (meaning latter in time), possibly past the cutover deadline, C, in which event it is likely that a migration (initial sync) is completed prior to the cutover deadline.

$Z(t)$ is a time series, and as such, can be used to extrapolate or predict whether $Z(t)$ will be negative or positive at time C (the cutover time) and by how much. For discrete times t<C, the time series $Z(t)$ can be determined and projected into the future.

Projection 304 changes as new samples are obtained and values of $S(t)/(C-t)$ are $T^*(t)$ computed. Generally, as long as $Z(t)$ is negative over the closed interval $[0, C]$, it is likely that the initial sync of a workload will complete before the cutover deadline C. If, however, $Z(t)$ becomes positive before C and remains so for a sufficient duration, then there is a strong likelihood the cutover deadline is exceeded prior to completing the workload migration.

Referring still to FIGS. 1 and 2, at block 206, adaptive workload manager 114 suspends migration of one or more selected workloads in response to determining that exceeding the cutover deadline prior to completing migration of each of the wave's workloads is likely. To make the determination, replication monitor 110 can continuously or intermittently gather data that is used by event generator 112 to repeatedly update at discrete times, t, the mean transfer rate, $T^*(t)$ (based on m samples 302) and the required transfer rate, $S(t)/(C-t)$. Based on $T^*(t)$ and $S(t)/(C-t)$, event generator 112 can repeatedly test whether $Z(t)=S(t)/(C-t)-T^*(t) \leq 0$. Again, as long (t) is negative over the closed interval [0, C], it is likely that the initial sync of a workload will complete before the cutover deadline C. To test whether this condition holds, updated projections of $Z(t)$ are generated at different times as time advances. A projection of $Z(t)$ that intercept the time axis (FIG. 3) to the left of C, induces event generator 112 to register a MISS event, as there is a subinterval of closed interval [0, C] in which $Z(t)$ is positive. In response to the projection of $Z(t)$ that intercepting the time axis (FIG. 3) to the right of C, event generator 112 registers a HIT event.

Optionally, event generator 112 generates an alarm in response to determining that migration of each workload of the wave prior to the cutover deadline is not likely. For example, during a given time interval, L (an integer) projections of $Z(t)$ can be generated. In response to determining that a certain portion of the projections (e.g., K of the L projections) register as MISS events, event generator 112 generates an alarm. The alarm indicates that it is likely that migration of each workload of the wave will not be completed prior to the cutover deadline.

Adaptive workload manager 114 automatically responds so as to mitigate the likelihood that each workload of the wave will not be completed prior to the cutover deadline by the suspending of one or more selected workloads' on-going migration. Adaptive workload manager 114 can select one or more migrations to suspend by searching for one or more workloads currently migrating from a wave associated with a latter cutover deadline than C. If no workloads of a wave associated with a cutover deadline latter than C are found from the search, then adaptive workload manager 114 selects one or more workloads from the wave associated with cutover deadline C. Event generator 112 using data obtained by replication monitor 110 from migration tool 102 determines whether and to what extent the suspension improves the expected bandwidth availability. Adaptive workload manager 114 can determine whether the suspension improved the expected bandwidth availability by revising estimates of the mean transfer rate $T^*(t)$ and required transfer rate $S(t)/(C-t)$, generating a new projection of $Z(t)$, and testing whether $Z(t)=S(t)/(C-t)-T^*(t) \leq 0$. If the suspension does not improve the expected bandwidth availability, adaptive workload manager 114 can reinitiate the suspended migration of the workload selected and repeat the search for a different workload from the wave associated with cutover deadline C to suspend.

The procedure can be repeated until a workload is selected whose suspension improves the expected bandwidth availability sufficient to make completion of the migrations prior to cutover deadline C likely or until the search runs through every workload in the wave whose associated cutover data is C. In the event that suspension of a workload from the wave whose associated cutover data is C does indeed improve bandwidth availability but not to an extent sufficient to make completion of the migrations prior to cutover deadline C likely, then adaptive workload manager 114 can search for another workload from the wave associated with cutover deadline C to suspend. The procedure can be repeated until bandwidth availability improves to an extent sufficient to make completion of the migrations prior to cutover deadline C likely or until the search runs through.

In response to determining that completing the migration prior to the cutover deadline is likely, then adaptive workload manager 114 selects one or more pending workloads and initiates migrations of the one or more pending workloads selected. This can occur in response to event generator 112 generating a HIT event when the projection of $Z(t)$ intercepts the time axis (FIG. 3) to the right of point C (the cutover deadline), which indicates it is likely that migration of each of the wave's workloads will be complete prior to C or until the search runs through every workload in the wave whose associated cutover deadline is C.

Figure 4:
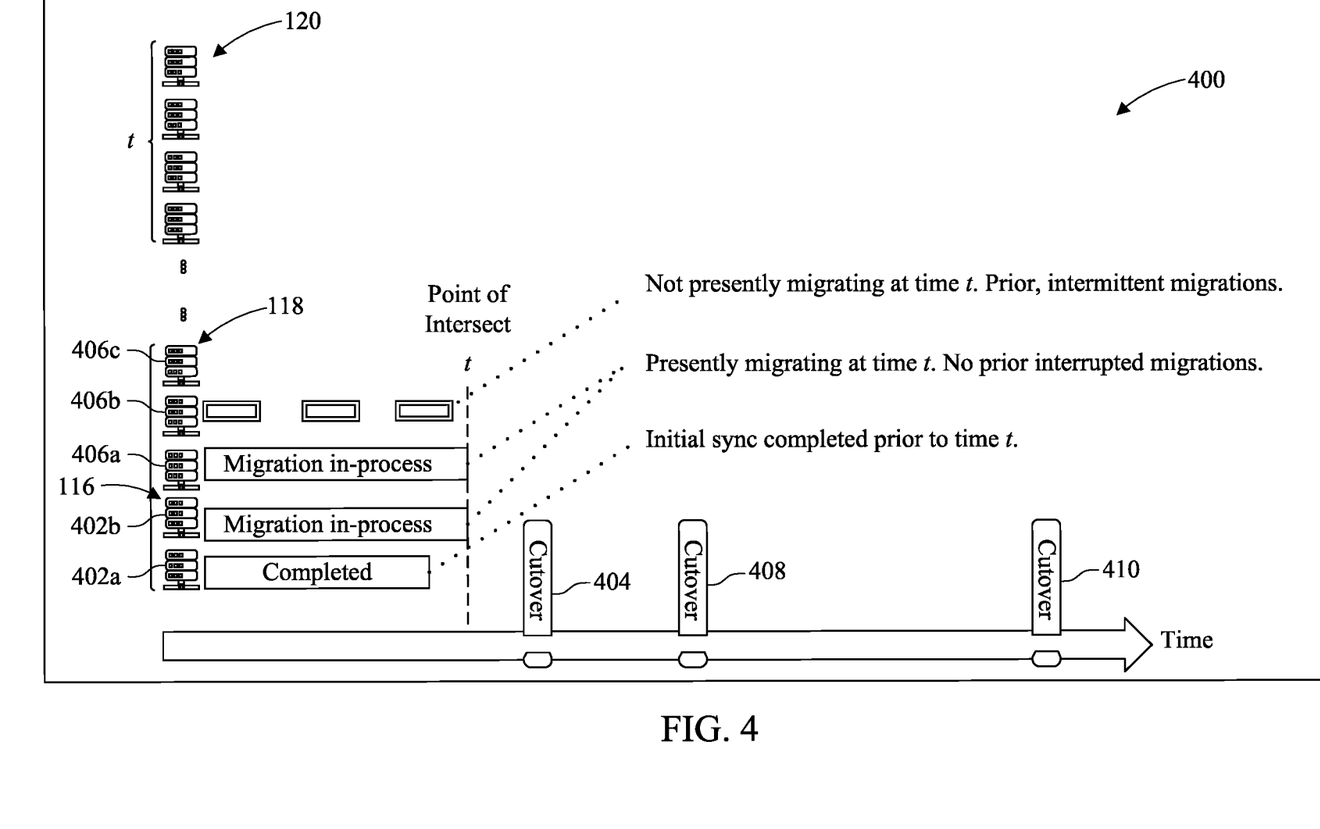
FIG. 4 is a graph representing certain operative procedures performed by the example system of FIG. 1.

Referring additionally to FIG. 4, graph 400 illustrates certain aspects of the described procedures performed with system 100. Graph 400 shows waves 116, 118, and 120 (FIG. 1). Workloads 402a and 402b belong to wave 116, whose cutover deadline is cutover 1 at point 404 on the horizontal time axis. Workloads 406a, 406b, and 406c belong to wave 118, whose cutover data is latter as shown at point 408 on the horizontal time axis. Wave 120 is associated with a still latter cutover deadline indicated by point 410 on the horizontal time axis. Illustratively, at time t workload 402a has already completed its migration prior to time t, while workload 402b is in process of migrating. Workload 406a of wave 118 is also in process of migrating, but workload 406b's migration, which has already been suspended on three separate occasions, is not in-process. Migration of workload 406c of wave 118 is pending.

In the event that adaptive workload manager 114 searches for a workload migration to suspend, it is wave 118 to which adaptive workload manager 114 looks initially given that wave 118's cutover deadline at point 408 is latter than wave 116's at point 404. The only choice from wave 118 is workload 406a because workloads 406b and 406c are not currently in process of migrating and hence have no effect on bandwidth availability. If suspending on-going migration of workload 406a fails to improve bandwidth availability to an extent sufficient to make completion of the migration of wave 116 prior to cutover deadline C likely, however, there are no on-going migrations of workloads from wave 116 other than workload 402b. Workload 402a already has completed migration prior to time t. In such a situation, event generator 112 can issue an alarm indicating that it is likely that migration of wave 116 will not be completed by cutover deadline C.

Optionally, rather than immediately issuing the alarm from event generator 112, replication monitor 110 can continue to monitor the on-going migration of wave 116 and for a given period of time so that new samples of transfer rates may be collected. With each new sample, the mean transfer rate can be updated, and new $Z(t)$ projections generated. Recall that if K of L $Z(t)$ projections intercept the time axis to the left of cutover deadline C, event generator 112 to generates a MISS event. Thus, event generator 112 can delay raising the alarm unless K of L events are MISS events. A user can pre-specify integer values for K and L.

The following pseudo code further elucidates certain aspects of the processes performed by system 100 in accordance with some arrangements:

1.  Cutovers = chronologically ordered list of cutover deadlines;
2.  All workloads are tagged as "Not Seen"
3.  for C in Cutovers that is in future and next to occur:
4.     start initial sync for all pending workloads (say XC) which have C as their cutover deadline
5.     while XC not finished syncing do:
6.        event := get the next MISS event for XC (for example: choose the event wherein the Z(t) is most positive for a workload in XC )
7.        If no event found
8.        then pick a workload which is pending and whose cutover deadline is after C (e.g. choose the workload which has highest Z(t) value)
9.           start sync of this workload
10.       else
11.          Y := Get a workload whose cutover deadline is after C and which is being synced (e.g. get the workload with the lowest Z(t) value) and not already tagged as "seen"
12.          If no workload found or there is a workload that is not "seen" then raise alarm to user
13.          else
14.             TC := current transfer rate for XC
15.             pause/throttle the sync of a workload Y
16.             T'C := Estimate transfer rate T(t) of workloads XC for a predefined period of time
17.                if the previous pausing/throttling of the workload did not lead to improvement of the transfer rate of XC , that is T'C ≤ TC then cancel pausing / throttling of Y, and mark Y as "seen". Goto step 11 to try another workload.
18.                else if throttling helped improve but not alleviate it then goto step 11 and look for another workload to further improve
19.                else do nothing Initially, system 100 tags each of a wave or group of workloads, Xc, to be migrated, tagging each as "Not Seen." (Line 1.) The cutover deadline for migration of the Xc workloads is C, which system 100 reads and then initiates an initial sync for each of the workloads, Xc. (Lines 2 and 3.) While the migration is in process, adaptive workload manager 114 successively responds to one or more system-generated MISS events by, for example, choosing a workload whose $Z(t) \geq 0$. If no such event is found, adaptive workload manager 114 selects a pending workload whose cutover deadline is after C. Adaptive workload manager 114, for example, can choose a workload that has the greatest corresponding Z(t) value and initiate the workload's initial sync. (Lines 4-8.)

Otherwise, in response to the MISS event for Xc, adaptive workload manager 114 can select a workload in process of migration from a wave whose cutover deadline is after C. Adaptive workload manager can select a workload whose corresponding Z(t) value is lowest, and not already tagged "Seen." (Lines 9 and 10.)

Event generator 112 generates an alarm if no workload meeting the criteria or tagged "Not Seen" is found. Otherwise, system 100 determines the current required transfer rate for Xc at time t and suspends a selected workload, Y (selected from Xc). The estimated mean transfer rate, $T^*(t')$, $t'>t$ over a predetermined period after workload Y is suspended is computed to determine whether suspending workload Y has improved the estimated mean transfer rate, that is, whether $T^*(t')>T^*(t)$. (Lines 11-15.) If the suspension of workload Y does not improve the transfer rate—that is, $T^*(t') \leq T^*(t)$—then adaptive workload manager 114 marks workload Y "Seen," reinitiates the workload's migration, and executes a GoTo 10 to repeat the process from that point. Adaptive workload manager 114 again executes GoTo 10 and searches for an additional workload to suspend if suspending workload Y improved the estimated mean transfer rate but did not eliminate the likelihood that Xc completes prior to cutover deadline C. (Lines 16 and 17). In the event that no corrective action is available to make it likely, event generator 112 can generate an alarm.

Figure 5:
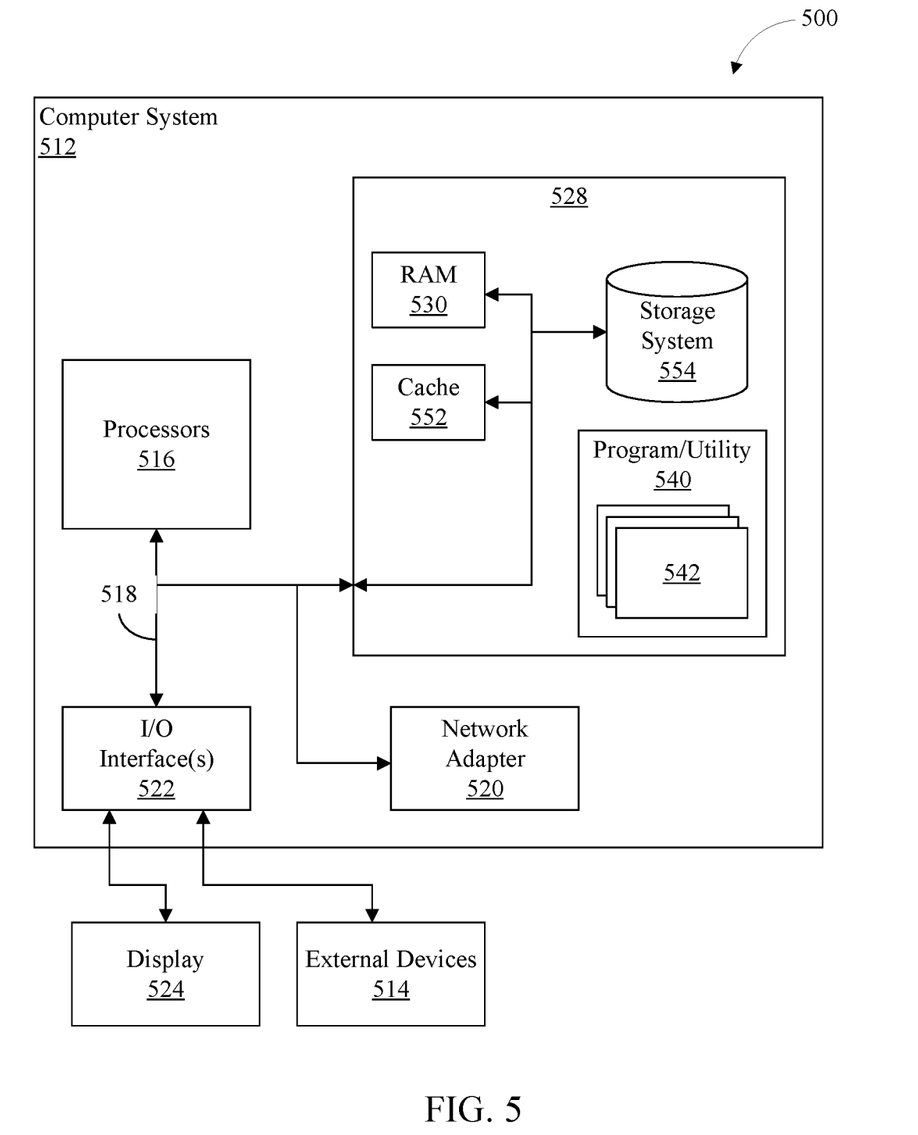
FIG. 5 depicts an example cloud computing node.

FIG. 5 illustrates a schematic of an example of a computing node 500. In one or more embodiments, computing node 500 is an example of a suitable cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 518 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system-readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include program code to implement a system for adaptive control of deadline-constrained workload migrations (e.g., system 100) or portions thereof.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

While computing node 500 is used to illustrate an example of a cloud computing node, it should be appreciated that a computer system using an architecture the same as or similar to that described in connection with FIG. 5 may be used in a non-cloud computing implementation to perform the various operations described herein. In this regard, the example embodiments described herein are not intended to be limited to a cloud computing environment. Computing node 500 is an example of a data processing system. As defined herein, "data processing system" means one or more hardware systems configured to process data, each hardware system including at least one processor programmed to initiate operations and memory.

Computing node 500 is an example of computer hardware. Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
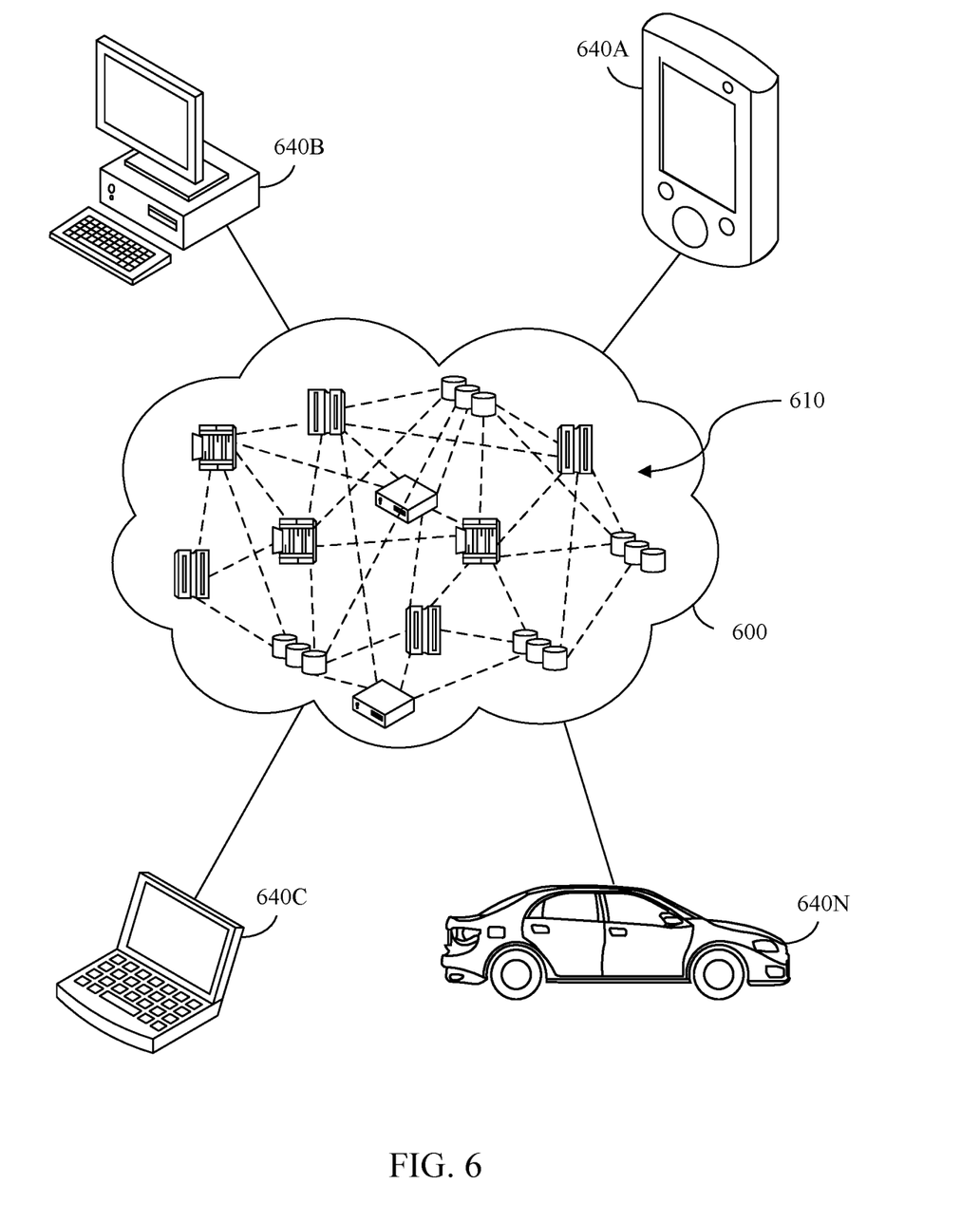
FIG. 6 depicts an example cloud computing environment.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640a, desktop computer 640b, laptop computer 640c, and/or automobile computer system 640n may communicate. Computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640a-n shown in FIG. 6 are intended to be illustrative only and that computing nodes 610 and cloud computing environment 600 can communicate with any type of computerized device over any type of network and/or network addressable connection (e.g., using a web browser).

Figure 7:
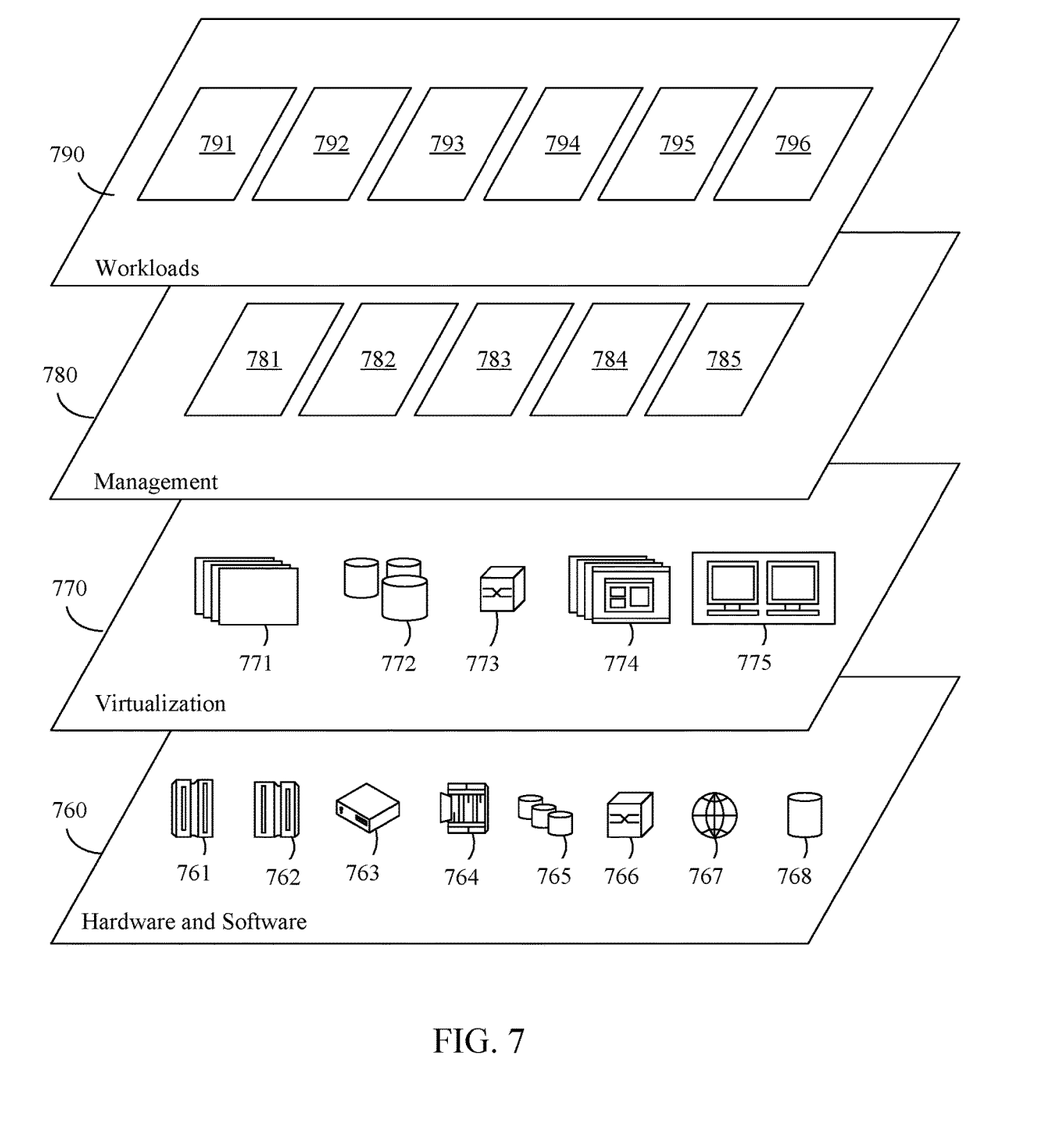
FIG. 7 depicts example abstraction model layers of the example cloud computing environment of FIG. 6.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and system for adaptive control of deadline-constrained workload migrations 796.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" refers to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   monitoring, with a computer, migrations of workloads forming a wave migrating from a source computing node to a target computing node, wherein the monitoring is performed in real time and wherein the migrations are performed by transferring image replications of each workload over a data communication network;
   predicting, with the computer, based on an expected bandwidth availability, a likelihood that a cutover deadline associated with the wave is exceeded prior to completing a migration of each of the wave's workloads; and
   suspending, with the computer, migration of one or more selected workloads of another wave in response to determining that exceeding the cutover deadline prior to completing migration of each of the wave's workloads is likely.

2. The method of claim 1, further comprising reinitiating migration of the one or more workloads selected and suspending migration of one or more other workloads in response to determining that suspending migrations of the one or more selected workloads failed to improve the expected bandwidth availability to make completion of the migrations prior to the cutover deadline likely.

3. The method of claim 1, further comprising selecting one or more pending workloads and initiating migrations of the one or more pending workloads selected, wherein the one or more pending workloads is selected in response to determining that completing the migration prior to the cutover deadline is likely.

4. The method of claim 1, further comprising generating an alarm in response to determining that migration of each workload of the wave prior to the cutover deadline is not likely.

5. The method of claim 4, further comprising performing a predetermined number of predictions over a given interval and generating the alarm in response to a predetermined portion of the predictions indicating a likelihood that the cutover deadline associated with the wave is exceeded prior to completing a migration of each of the wave's workloads.

6. The method of claim 1, wherein the expected bandwidth availability is based on a comparison of a mean transfer rate with a transfer rate required to complete migration of the workloads of the wave prior to the cutover deadline.

7. The method of claim 6, wherein the mean transfer rate is determined based on a predetermined number of weighted samples of past transfer rates wherein the samples are weighted to give greater effect to samples corresponding to more recent transfers of image replications over the data communication network.

8. A system, comprising:
a processor configured to initiate operations including:
monitoring migrations of workloads forming a wave migrating from a source computing node to a target computing node, wherein the monitoring is performed in real time and wherein the migrations are performed by transferring image replications of each workload over a data communication network;
predicting, based on an expected bandwidth availability, a likelihood that a cutover deadline associated with the wave is exceeded prior to completing a migration of each of the wave's workloads; and
suspending migration of one or more selected workloads of another wave in response to determining that exceeding the cutover deadline prior to completing migration of each of the wave's workloads is likely.

9. The system of claim 8, wherein the processor is configured to initiate operations further including reinitiating migration of the one or more workloads selected and suspending migration of one or more other workloads in response to determining that suspending migrations of the one or more selected workloads failed to improve the expected bandwidth availability to make completion of the migrations prior to the cutover deadline likely.

10. The system of claim 8, wherein the processor is configured to initiate operations further including selecting one or more pending workloads and initiating migrations of the one or more pending workload selected, wherein in the one or more pending workloads is selected in response to determining that completing the migration prior to the cutover deadline is likely.

11. The system of claim 8, wherein the processor is configured to initiate operations further including generating an alarm in response to determining that migration of each workload of the wave prior to the cutover deadline is not likely.

12. The system of claim 11, wherein the processor is configured to initiate operations further including performing a predetermined number of predictions over a given interval and generating the alarm in response to a predetermined portion of the predictions indicates a likelihood that the cutover deadline associated with the wave is exceeded prior to completing a migration of each of the wave's workloads.

13. The system of claim 8, wherein the expected bandwidth availability is based on a comparison of a mean transfer rate with a transfer rate required to complete migration of the workloads of the wave prior to the cutover deadline.

14. A computer program product, the computer program product comprising:
one or more computer-readable storage media and program instructions collectively stored on the one or more computer-readable storage media, the program instructions executable by a processor to cause the processor to initiate operations including:
monitoring migrations of workloads forming a wave migrating from a source computing node to a target computing node, wherein the monitoring is performed in real time and wherein the migrations are performed by transferring image replications of each workload over a data communication network;
predicting, based on an expected bandwidth availability, a likelihood that a cutover deadline associated with the wave is exceeded prior to completing a migration of each of the wave's workloads; and
suspending migration of one or more selected workloads of another wave in response to determining that exceeding the cutover deadline prior to completing migration of each of the wave's workloads is likely.

15. The computer program product of claim 14, wherein the program instructions are executable by the processor to cause the processor to initiate operations further including reinitiating migration of the one or more workloads selected and suspending migration of one or more other workloads in response to determining that suspending migrations of the one or more selected workloads failed to improve the expected bandwidth availability to make completion of the migrations prior to the cutover deadline likely.

16. The computer program product of claim 14, wherein the program instructions are executable by the processor to cause the processor to initiate operations further including selecting one or more pending workloads and initiating migrations of the one or more pending workload selected, wherein in the one or more pending workloads is selected in response to determining that completing the migration prior to the cutover deadline is likely.

17. The computer program product of claim 14, wherein the program instructions are executable by the processor to cause the processor to initiate operations further including generating an alarm in response to determining that migration of each workload of the wave prior to the cutover deadline is not likely.

18. The computer program product of claim 17, wherein the program instructions are executable by the processor to cause the processor to initiate operations further including performing a predetermined number of predictions over a given interval and generating the alarm in response to a predetermined portion of the predictions indicates a likelihood that the cutover deadline associated with the wave is exceeded prior to completing a migration of each of the wave's workloads.

19. The computer program product of claim 14, wherein the expected bandwidth availability is based on a comparison of a mean transfer rate with a transfer rate required to complete migration of the workloads of the wave prior to the cutover deadline.

20. The computer program product of claim 14, wherein the mean transfer rate is determined based on a predetermined number of weighted samples of past transfer rates wherein the samples are weighted to give greater effect to samples corresponding to more recent transfers of image replications over the data communication network.

\* \* \* \* \*